Patented June 6, 1933

1,912,701

UNITED STATES PATENT OFFICE

CHRISTIAN GAMARRA, OF BOSTON, MASSACHUSETTS

METHOD OF TREATING GYPSUM AND RESULTING PRODUCT

No Drawing. Application filed October 12, 1927, Serial No. 225,835. Renewed October 12, 1932.

This invention relates to a method of and composition for making cementitious products from calcined gypsum which shall be characterized by a hard, porous structure and also by an effective resistance to the softening action of water.

In making various products from calcined gypsum, such as molded building materials and the like, it is generally necessary to develop relatively high tensile and crushing strengths. A porous structure, however, is sometimes desirable, for insulation purposes and to reduce the dead loads, as well as a marked resistance to the action of water which frequently causes softening and crumbling of the set gypsum.

For the purpose of forming a porous structure, or "aerating" so-called, it has heretofore been proposed to mix with the calcined gypsum a carbonate (such as magnesium or sodium carbonate) and an acid which upon wetting undergo chemical reaction and liberate carbon dioxide gas. This forms innumerable small bubbles throughout the mass, causing it to swell rapidly and extensively in volume, and also to effervesce before it has an opportunity to set. Such mixtures do not produce strong products, even after they have completely set (which usually requires a prolonged period of time) and they are very friable and soft or even mushy when wet with water. Moreover, the effervescent mass is difficult to mold, non-uniform in structure, and made up of thin and extremely weak walls which may collapse even before the gypsum has set.

It is accordingly an object of the present invention to provide a method and means for preparing cementitious products of gypsum having the desired qualifications of strength, hardness, porosity and water resistance, and which shall be commercially applicable for making building materials and the like. Other objects will appear from the following description.

The method of the invention includes the steps of commingling with a calcined gypsum containing carbonate of the alkaline earth metals (either previous to or concurrently with the addition of water to effect the setting reaction) a reagent or reagents characterized by reacting with each other and/or with the calcined gypsum, gradually, to liberate carbon dioxide gas and preferably to form one or more relatively insoluble or water-resistant by-products,—and finally causing or permitting the mixture to react and set.

It is found as a part of this invention that commercial gypsum upon being calcined in the usual way, contains a considerable proportion (frequently from 5% to 10%) of carbonate,—i. e., probably calcium carbonate, per se, or a potential carbonate component of the gypsum, from which carbon dioxide may be easily liberated. Such liberation of gas may conveniently serve to effect aeration of the mixture during the setting reaction of the gypsum and it is found that such liberation and aeration may be controlled by the proportions and components of the mixture from which it is caused to set.

The reagent or reagents thus employed are in general characterized by containing a reactive salt of a strong (inorganic) acid radical and, typically, an alkaline earth metal such as calcium chloride, and an acid or acid salt having a weak acid radical such as tartaric acid or an acid tartrate capable of reacting with the reactive salt,—preferably to produce a relatively insoluble product and gradually liberate carbon dioxide from the gypsum or other carbonate present.

It is thought that the interaction of the two reagents effects the liberation of the strong acid of the reactive salt in a free condition, which is capable of reacting with any carbonate present to produce free carbon dioxide gas therefrom.

To control the rate of evolution of gas and also improve the water resistance of the resulting product it is further desirable that the acidic reagent shall react more slowly and form a relatively insoluble product. For this purpose a reactive salt and a less active acid, such as the organic acids, acetic, tartaric, oxalic or citric, may be used. On the other hand, it is found that sulfuric acid reacts too rapidly and increases the rate of setting of the cement substantially without aeration; while certain very weak acids, such as tannic, boric and salicylic, fail to liberate carbon dioxide from solid combination and leave the set gypsum in such condition that it is rapidly disintegrated by water.

A specific instance of application of the invention will be described with respect to commercial gypsum, in which calcium chloride is used as the soluble reactive salt and tartaric acid as representative of the acidic reagent for effecting aeration. The reactions involved may be represented as follows:

$$CaCl_2 + H_2C_4H_4O_6 \rightarrow CaC_4H_4O_6 + 2HCl$$

the calcium tartrate being relatively insoluble (e. g. .016 parts per hundred of water); and $$2HCl + CaCO_3 \rightarrow CaCl_2 + H_2O + CO_2$$
$$CaSO_4 \cdot \tfrac{1}{2}H_2O + 1\tfrac{1}{2}H_2O \rightarrow CaSO_4 \cdot 2H_2O.$$

It is thought that the presence of the calcium chloride, on account of its hygroscopic properties, may serve to take up part of the water of the mixture and thus make it effectively more concentrated (less fluid) than would otherwise be the case;—and furthermore that it has a salting out effect upon the carbon dioxide, thus expelling it from solution and rendering it effective as an aerating agent.

The dry, pulverized, calcined gypsum (obtained for example by calcining crude gypsum ore according to the usual procedure) is preferably mixed with calcium chloride and tartaric acid in the dry condition. The proportions may conveniently be of the order of 500 grams of gypsum, 40 grams calcium chloride, and 7.5 grams of the acid. After complete mixing, to produce uniform distribution of the ingredients, the composition may be stirred into a quantity of water, whereupon the aerating and setting reactions commence, carbon dioxide gas being formed throughout the mass but gradually and continuously, without effervescence or appreciable escape of gas from the mixture and ending before a rigid set of the cement has occurred. The amount of water may be varied somewhat, depending upon the consistency required, but approximately 250 c.c. is ordinarily satisfactory.

When the complete charge has been prepared, it is mixed preferably just long enough to effect complete wetting of the powder and uniformity of distribution throughout the volume of the mold into which it may be poured. (Excessive stirring tends to reduce the size of the individual bubbles and also promotes escape of the gaseous carbon dioxide from the mixture altogether, while the application of pressure to the mold during or immediately after the reaction may substantially prevent aeration and produce a relatively dense solid product.) It is then permitted to stand quiescent, whereupon the mass gradually swells (if in an open mold) to a maximum volume which is maintained without subsequent shrinkage and also without appreciable escape of the expanding gas. The degree of expansion may be slight or to several times the original volume of the mixture, depending upon the reagents used and their relative proportions, but when complete, the charge undergoes the setting reaction. This is sufficiently advanced to give an apparent solidity in 20 to 30 minutes, although hardening may continue for some time thereafter. Thus the molds may be removed at an early stage, whereupon the remaining final "set" and complete hardening is hastened by drying.

The aeration obtained is thought to be attributable to a preliminary reaction between the calcium or magnesium chloride and the acidic reagent to product relatively insoluble salt and free hydrochloric acid, which is known to be capable of dissolving gypsum. In the solution thus formed the dissolved gypsum may be considered as calcium acid sulfate which, together with the hydrochloric acid, may then react with the calcium carbonate (or carbon dioxide component of the gypsum) to liberate carbon dioxide. As an example of an acid salt which will serve as the acidic reagent, sodium bicarbonate may be mentioned which, as a substitute for the tartaric acid and preferably with smaller proportions of both calcium chloride and the bicarbonate, produces like results of effective aeration of the mass and a relatively water-resistant product upon setting.

But, whatever may be the true explanation of the cause and mechanism of the reactions which take place, it is observed that the mass may be expanded in volume by 25 to 200% above its original volume and that the bubbles formed are uniformly distributed and relatively large. Moreover, the interstitial walls of cementitious material are generally thicker and harder than those obtained by practices of the prior art so that the molded article not only has greater compressive and tensile strength but is firmer, more dense and stronger at its surface walls. To enhance this latter effect the mixture appears to coalesce over its boundary surfaces (both those in contact with the mold and the exposed surfaces)—rendering them additionally stronger and less porous than a cross-sectional surface. But it is further observed that products made in accordance with the invention are relatively resistant to water (or waterproof) and not appreciably hygroscopic. Accordingly they are well adapted for use as building materials or the like, and possess and retain a porous structure, insulating properties, good tensile and crushing strength, and resistance to the erosive and softening action of water.

I claim:

1. A cementitious composition, comprising commercial calcined gypsum and calcium carbonate, calcium chloride and an organic acid, characterized by reactivity with the chloride to liberate hydrochloric acid and to produce a relatively insoluble product of reaction.

2. A cementitious composition, comprising calcined gypsum, containing carbonate, calcium chloride and tartaric acid.

3. A method of making aerated gypsum products, which comprises mixing with calcined gypsum, containing calcium carbonate, water, a small amount of a chloride of an alkaline earth metal and an organic acid characterized by reacting with the chloride to form a relatively insoluble reaction product and hydrochloric acid, and permitting the mixture to set.

4. A method of making water-resistant aerated gypsum products, which comprises mixing with calcined gypsum, containing calcium carbonate,—water, a small amount of calcium chloride and tartaric acid, and permitting the mixture to set.

Signed by me at Boston, Massachusetts, this eleventh day of October, 1927.

CHRISTIAN GAMARRA.